(12) United States Patent
Pham et al.

(10) Patent No.: US 12,041,645 B2
(45) Date of Patent: *Jul. 16, 2024

(54) SYSTEMS, METHODS AND DEVICES FOR ATM ACCESS DURING OUTAGES

(71) Applicant: Capital One Services, LLC, McLean, VA (US)

(72) Inventors: Vincent Pham, Champaign, IL (US); Jeremy Goodsitt, Champaign, IL (US); Anh Truong, Champaign, IL (US); Mark Watson, Urbana, IL (US); Austin Walters, Savoy, IL (US); Galen Rafferty, Mahomet, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,781

(22) Filed: Nov. 15, 2021

(65) Prior Publication Data

US 2022/0078800 A1 Mar. 10, 2022

Related U.S. Application Data

(63) Continuation of application No. 16/530,498, filed on Aug. 2, 2019, now Pat. No. 11,176,560.

(51) Int. Cl.
*G06Q 40/00* (2023.01)
*H04L 5/00* (2006.01)
(Continued)

(52) U.S. Cl.
CPC ......... *H04W 72/541* (2023.01); *H04L 5/0082* (2013.01); *H04L 5/1469* (2013.01); *H04W 72/0473* (2013.01)

(58) Field of Classification Search
None
See application file for complete search history.

(56) References Cited

U.S. PATENT DOCUMENTS 6,249,278 B1 * 6/2001 Segan .................... G09F 19/02
                                                345/204
9,318,915 B2    4/2016 Miller et al.
(Continued)

FOREIGN PATENT DOCUMENTS

KR    2016-0035548 A  *  3/2016   ............ G06Q 40/02
KR    20160035548 A      3/2016

*Primary Examiner* — Olabode Akintola
(74) *Attorney, Agent, or Firm* — Sterne, Kessler, Goldstein & Fox P.L.L.C.

(57) ABSTRACT

Disclosed herein are system, method, and device embodiments for ATM access during a power outage. In an example embodiment, an automated teller machine (ATM) may receive power from a mobile device including a banking application, send the power to a rechargeable battery of the ATM, and enter a reduced power mode, wherein the ATM is powered by the rechargeable battery. Further, the ATM may receive a transaction request including an authentication credential from the banking application, determine an account associated with the authentication credential, determine an authorization result indicating whether to perform the transaction request, and generate recordation information corresponding to the authorization result.

30 Claims, 5 Drawing Sheets

(51) Int. Cl.
*H04L 5/14* (2006.01)
*H04W 72/044* (2023.01)
*H04W 72/541* (2023.01)

(56) References Cited

U.S. PATENT DOCUMENTS

| | | |
|---|---|---|
| 9,431,839 B2 | 8/2016 | Suomela |
| 10,467,604 B1* | 11/2019 | Dorsch .............. G06Q 20/3223 |
| 10,531,299 B1* | 1/2020 | Osborn ................. H04W 12/06 |
| 2011/0018356 A1* | 1/2011 | Chatterjee ............... H02J 7/025 |
| | | 307/104 |
| 2013/0073467 A1* | 3/2013 | Underwood ......... G06Q 20/401 |
| | | 705/71 |
| 2014/0097241 A1* | 4/2014 | Tovar ..................... G07F 7/088 |
| | | 235/380 |
| 2016/0098904 A1* | 4/2016 | Choudhury ............ G06Q 40/02 |
| | | 705/43 |
| 2016/0148199 A1* | 5/2016 | Vitsut .................... G06Q 40/02 |
| | | 705/39 |
| 2018/0232739 A1 | 8/2018 | Battle |
| 2018/0301790 A1 | 10/2018 | Kim et al. |
| 2019/0068004 A1 | 2/2019 | Louis |
| 2019/0207759 A1* | 7/2019 | Chan .................... H04L 9/0861 |
| 2021/0035101 A1 | 2/2021 | Pham et al. |

* cited by examiner

SYSTEMS, METHODS AND DEVICES FOR ATM ACCESS DURING OUTAGES

CROSS-REFERENCE TO RELATED APPLICATIONS

This application is a continuation application of U.S. Utility application Ser. No. 16/530,498 filed Aug. 2, 2019, the contents of which are incorporated herein in their entirety by reference.

BACKGROUND

Typically, an automated teller machine (ATM) may receive electrical power from a power source. However, many disruptive events (e.g., natural disasters, inclement weather, electrical outages, etc.) may prevent the ATM from obtaining power from a power source, thus rendering the ATM inoperable to customers hoping to perform financial transactions (e.g., withdrawal of cash funds). Unfortunately, disruptive events often increase the need for cash funds as electronic transactions may be difficult to complete.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and enable a person skilled in the relevant art to make and use the disclosure.

The drawing in which an element first appears is typically indicated by the leftmost digit or digits in the corresponding reference number.

DETAILED DESCRIPTION OF THE INVENTION

Provided herein are system, apparatus, device, method and/or computer program product embodiments, and/or combinations (including sub-combinations) thereof, for implementing ATM access during a power outage.

Figure 1:
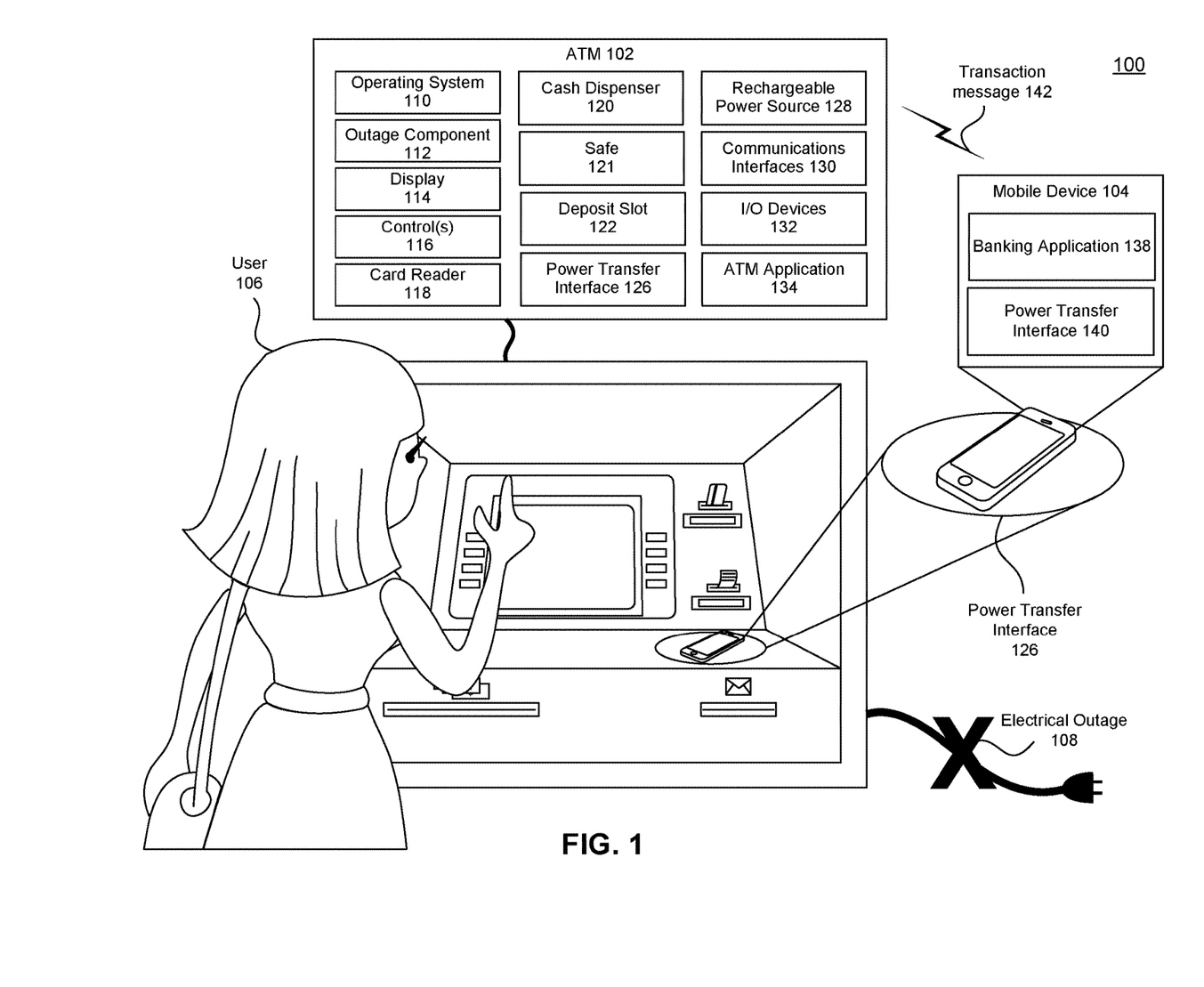
FIG. 1 is a block diagram of an example environment in which systems, devices and/or methods described herein may be implemented, according to embodiments of the present disclosure.

FIG. 1 illustrates a block diagram of an example framework for implementing a system for ATM access during a power outage, according to embodiments of the present disclosure. As illustrated in FIG. 1, an ATM power outage access system 100 may include an ATM 102 and a mobile device 104 of a user 106. As described in detail herein, the user 106 may employ the mobile device 104 to provide power to the ATM 102. For instance, the user 106 may endeavor to use the ATM 102 during an electrical outage 108, and employ capabilities of the mobile device 104 to provide power to the ATM 102.

In some embodiments, the ATM 102 may include an operating system 110, outage component 112, a display 114, one or more controls 116, a card reader 118, a cash dispenser 120 connected to a safe 121, a deposit slot 122 connected to the safe 121, a power transfer interface 126, a rechargeable power source 128, communication interfaces 130, and/or one or more input/output devices 132. Further, the ATM 102 may be configured to facilitate financial transactions by a customer (e.g., the user 106) having a financial account. Some examples of financial transactions that may be performed using the ATM 102 can include currency withdrawals (e.g., cash withdrawals, cryptocurrency withdrawals, etc.), currency deposits (e.g., cash deposits, cryptocurrency deposits, etc.), transfer of funds (e.g., transferring from a first financial account to a second account), obtaining financial account information, checking a financial account balance, printing checks, printing account statements, printing money orders, etc.

The operating system 110 may be an application program configured to manage the basic functions of the ATM 102. As used herein, and in some embodiments, an "application" may refer to any application or software (e.g., client, agent, application, mobile application, web application, hybrid application, computer program, desktop application, or component) operable to execute on the ATM 102.

The operating system 110 may be configured to schedule tasks, manage storage of data on the ATM 102, provide common services to the components and applications of the ATM 102, or communicate with peripheral devices associated with the ATM 102. Further, in some embodiments, the operating system 110 or an ATM application 134 executing on the operating system 110 may provide a user interface for performing financial transactions.

As an example, the ATM application 134 may present a graphical user interface (GUI) to the user 106 via the display 114. In some embodiments, the GUI may include textual information instructing the user 106 to perform an authentication process for identifying the user 106. For instance, the textual information may instruct the user 106 to place a bank card possessed by the user 106 in proximity to or inside the card reader 118, and enter a personal identification number (PIN) code via the controls 116 (e.g., one or more buttons in the ATM) and/or via a touch screen of a display 114 that includes a touch screen (in some embodiments, display 114 may include a touch screen, and in some embodiments display 114 may not include a touch screen).

Additionally, or alternatively, in some embodiments, the user 106 may use the mobile device 104 to perform the authentication process. For instance, the user 106 may cause an interaction, between the mobile device 104 and the communication interfaces 130 (e.g., near-field communication, Bluetooth, via a server device, and/or any other suitable communication interface), that transmits an authentication credential from the mobile device 104 to the ATM 102. In some other instances, the mobile device 104 may receive an authentication credential (e.g., a passcode) from a financial institution, and provide the authentication credential to the ATM 102 via the controls 116 or a touch screen of a display 114.

Further, the GUI may include a graphical element for selecting, via the controls 116 and/or a touch screen of the display 114, one or more financial transactions to perform at the ATM 102. For instance, the user 106 may choose to deposit cash funds into a financial account associated with the user 106. In response, the GUI may present textual information instructing the user 106 to place the cash funds into the deposit slot 122. Once the cash funds are received via the deposit slot 122, the ATM application 134 may send a notification to the financial institution associated with the ATM 102 and/or with the financial account indicating that the user 106 has deposited the cash funds into the ATM 102. In response, the financial institution may update the account balance of the financial account associated with the user 106, and/or the cash balance of the safe 121 of the ATM 102.

In another example, the user 106 may request to withdraw a specific amount of cash funds from a financial account associated with the user 106. In response, the banking application 134 may determine whether the user 106 is authorized to receive the requested amount of cash funds from the ATM 102, and instruct the ATM 102 to disburse the requested amount of cash funds via the cash dispenser 120 when the user 106 is authorized to receive the requested amount of funds. Once the cash funds are disbursed to the user 106 via the cash dispenser 120, the ATM application 134 may send a notification to a financial institution associated with the ATM 102 and/or with the financial account indicating that the user 106 has withdrawn the cash funds from the safe 121. In response, the financial institution may update the account balance of the financial account associated with the user 106, and/or the cash balance of the safe 121 of the ATM 102.

In addition, an ATM 102 of an example embodiment may employ I/O devices 132 to facilitate financial transactions. For example, I/O devices 132 may include a speaker configured to provide audible notifications to the user 106. As another example, I/O devices 132 may include a camera configured to capture visual information (e.g., photographic information or video information) while the user 106 interacts with the ATM 102. Further, the visual information may be used for security purposes or fraud prevention purposes.

In some instances, an electrical outage 108 or other hazard may disrupt the power supplied to the ATM 102. As described herein, in order for the customer 106 to perform financial transactions using the ATM 102 during an electrical outage 108, the user 106 may cause an interaction between the ATM 102 and mobile device 104 that results in the mobile device 104 supplying power to the ATM 102. For example, as illustrated in FIG. 1, a user 106 may place a mobile device 104 in proximity to a power transfer interface 126 of an ATM 102. Once a mobile device 104 is placed in proximity to a power transfer interface 126 of an ATM 102, a power transfer interface 140 of the mobile device 104 may supply power to a rechargeable power source 128 of ATM 102. In some embodiments, power transfer interfaces 126 and 140 may include any suitable wireless power transfer interfaces, and the power transfer interface 140 may wirelessly supply power to the power transfer interface 126. Some examples of wireless power transfer interfaces may rely on near-field wireless power transfer techniques (e.g., inductive coupling, capacitive coupling, etc.), far field wireless power techniques, and/or other suitable wireless power transfer techniques. Additionally, or alternatively, power transfer interfaces 126 and 140 may include wired interfaces (e.g., universal serial bus interfaces, universal serial bus type C interfaces, or other suitable wired interfaces), and the power transfer interface 140 may supply power to the power transfer interface 126 via a wired connection.

In some embodiments, the ATM 102 may operate in a standard operating mode when receiving power via a standard power source (e.g., accessed via an electrical outlet). In the standard operating mode, the ATM 102 may perform financial transactions based upon instructions received from the operating system 110 or an ATM application 134. Further, a standard power source may charge a rechargeable power source 128 in standard operating mode. Additionally, in response to an electrical outage 108, an ATM 102 may switch operation to an outage mode wherein the ATM 102 may perform financial transactions based upon instructions received from an outage component 112. In some embodiments, outage component 112 may be a component of the ATM 102 that operates separately from the operating system 110. For instance, the outage component 112 may be an embedded controller within the ATM 102. In some other embodiments, the outage component 112 may be a component of the operating system 110 or the ATM application 134.

Further, in some embodiments, the outage mode may be a reduced power mode that provides limited functionality of the ATM 102. For instance, one or more components of the ATM 102 may be inactive within the outage mode in order to conserve the battery power of the rechargeable power source 128. As an example, the outage component 112 may utilize the deposit slot 122 to receive cash funds from the user 106, the cash dispenser 120 to disburse cash funds to the user 106, the rechargeable power source 128 to supply power to the ATM 102, and the communication interfaces 130 to communicate with a banking application 138 of mobile device 104. In some examples, outage component 112 may further utilize the display 114 of the ATM 102 to provide a GUI to the user 106 and/or the controls 116 to interact with the GUI presented within the display 114, or the communication interfaces 130 to communicate with a financial institution associated with the ATM 102 or the user 106.

Additionally, in some embodiments, the banking application 138 may supplement the functionality of the outage component 112. For instance, in some examples, the outage component 112 may be unable to utilize the communication interfaces 130 to obtain authentication information (e.g., PIN codes, passwords, etc.) or authorization information (e.g., account balance information, daily withdrawal limits, funds transfer limits, etc.) from a financial institution associated with the user 106 in order to conserve the battery power of the rechargeable power source 128. Instead, the banking application 138 may perform portions of an authentication process or authorization process to determine whether to perform a requested transaction.

As an example, the banking application 138 may track outage mode transactions performed by the banking application 138 at any ATM in the outage mode. Further, in an example embodiment, when the user 106 requests a withdrawal transaction at an ATM 102, the banking application 138 may approve or deny the requested transaction based on comparing the sum of the outage mode transactions to an outage withdrawal limit. In some other examples, the banking application 138 may obtain the current account balance of an account associated with the user 106 from a financial institution. Further, when the user 106 requests a withdrawal transaction at the ATM 102, the banking application 138 may approve or deny the requested transaction based on comparing the current account balance to the requested withdrawal amount.

In another instance, an outage component 112 may not utilize a display 114 in the outage mode in order to conserve the battery power of the rechargeable power source 128. Instead, the banking application 138 may display information and receive commands from the user 106. In some other instances, the outage component 112 may not utilize the communication interfaces 130 in the outage mode to communicate with a financial institution in order to conserve the battery power of the rechargeable power source 128. Instead, the outage component 112 may transmit a message for a financial institution to the banking application 138 via the communication interfaces 130, and request the banking application 138 to transmit the message to the financial institution. In yet still some other instances, the outage component 112 may not utilize the controls 116 or the I/O devices in the outage mode in order to conserve the battery power of the rechargeable power source 128. Instead, the outage component 112 may receive commands from the user 106 via the banking application 138, reproduce audible notifications for the user 106 via the banking application 138, and/or capture visual information (e.g., photographic information or video information) about the user 106 via the banking application 138.

As an example, the user 106 may endeavor to withdraw funds from the ATM 102 during the electrical outage 108. The banking application 138 or the ATM 102 may notify the user 106 that the electrical outage 108 has disrupted the provision of power to the ATM 102, and instruct the user 106 to charge the rechargeable power source 128 using the mobile device 104. As described above, the user 106 may place a mobile device 104 in proximity to a power transfer interface 126 in order to facilitate the mobile device 104 providing power to the rechargeable power source 128. Alternatively, the user 106 may employ a portable power source or another mobile device to power the ATM 102 while employing the banking application 138 of the mobile device 104 to perform a financial transaction with the ATM 102. Some examples of a portable power source include a power bank, a portable charger, or any other portable device capable of providing power to another device.

Once the rechargeable power source 128 has received enough power from the power transfer interface 140 to adequately operate the ATM 102, the outage component 112 and the banking application 138 may facilitate the disbursement of cash funds to the user 106. For instance, the banking application 138 may authenticate the user 106 to identify the user 106 and/or determine a financial account associated with the user 106. Further, the banking application 138 may send the outage component 112 an authentication credential that may be used by the outage component 112 to identify a financial account of the user 106 and the banking application 138. In some embodiments, the authentication credential may be used by the ATM 102 to determine that the banking application 138 has not been compromised or otherwise tampered with. Additionally, or alternatively, the authentication credential may be used by the ATM 102 to determine that the banking application 138 is associated with a financial institution having financial accounts authorized to perform outage mode transactions at the ATM 102.

Once the user 106 has been authenticated, the banking application 138 may present a GUI requesting that the user 106 specify an amount of cash funds to withdraw, and receive a requested withdrawal amount from the user 106 via the GUI. Once the user 106 has provided the requested withdrawal amount, the banking application 138 may perform an authorization process. For instance, the banking application 138 may determine whether the requested withdrawal amount is greater than the last known account balance of the user 106, or determine whether the user 106 has surpassed an outage withdrawal limit.

If the banking application 138 approves the requested transaction, the banking application 138 may send a transaction message 142 including the requested withdrawal amount to the outage component 112. In some embodiments, the transaction message 142 may include a transaction type identifying the type of transaction (e.g., withdrawal, deposit, etc.), the authentication credential identifying a financial account associated with the user 106, and the requested withdrawal amount.

Upon receipt of the transaction message 142, the outage component 112 may perform an authorization process to determine whether to perform the requested transaction. For example, the outage component 112 may determine whether the requested transaction is an authorized transaction based upon at least one of the account identifier or the amount of requested cash funds of the transaction message 142. For example, the outage component 112 may deny the requested transaction based on the requested withdrawal funds being greater than an outage withdrawal limit, the financial account of the user 106 not being approved to perform outage mode transactions at the ATM 102, or the requested withdrawal funds being greater than the amount of cash funds in the safe 121. In some embodiments, the outage withdrawal limit may be associated with the ATM 102, the user 106, a financial institution associated with the ATM 102 or a financial account, or a financial account associated with the ATM 102 or the user 106, etc., or combinations thereof.

If the outage component 112 determines that the requested transaction is an authorized transaction, the outage component 112 may instruct the cash dispenser 120 to disburse the requested cash funds from the safe 121 of the ATM 102. Further, the outage component 112 may instruct the banking application 138 to display a notification indicating that the cash dispenser 120 will be disbursing the requested cash funds. If the outage component 112 determines that the requested transaction is not an authorized transaction, the outage component 112 may provide a notification to the user 106 indicating that requested transaction has been denied. For instance, the outage component 112 may instruct the banking application 138 to display a notification that the requested transaction has failed.

Figure 2:
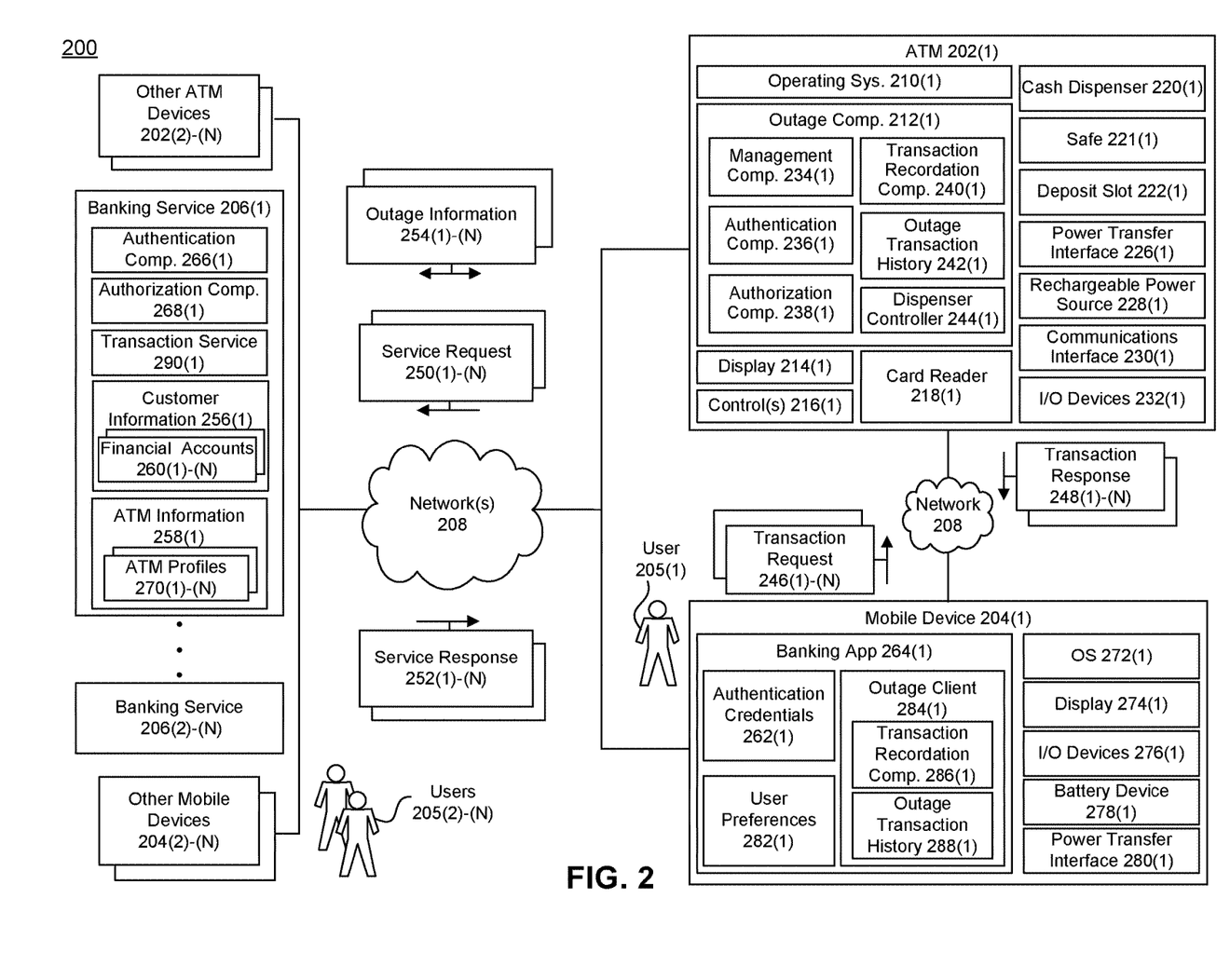
FIG. 2 is a block diagram of an example environment in which systems, devices and/or methods described herein may be implemented, according to embodiments of the present disclosure.

FIG. 2 illustrates a block diagram of an example framework for implementing a system for ATM access during a power outage, according to some embodiments of the present disclosure. As illustrated in FIG. 2, an ATM power outage access system 200 may include an ATM 202, a plurality of mobile devices 204(1)-(N) associated with a plurality of users 205(1)-(N), and a plurality of banking services 206(1)-(N) each operated by a financial institution. Further, in some embodiments, a first mobile device 204(1) is associated with a first user 205(1), and a second mobile device 204(2) is associated with a second user 205(2), an Nth mobile device 204(N) is associated with an Nth user 205(N), and so forth.

As described in detail herein, the users 205(1)-(N) may employ the mobile devices 204(1)-(N) to provide power to the ATMs 202(1)-(N). For instance, the user 205(1) may endeavor to use the ATM 202(1) during an electrical outage, and employ the charging capabilities of the mobile device 204(1) to provide power to the ATM 202(1).

Additionally, the ATMs 202(1)-(N), the mobile devices 204(1)-(N), and the banking services 206(1)-(N) may communicate via a communication network(s) 208. The communication network(s) 208 may include any or all of a private network, personal area network (PAN), Local-Area Network (LAN), Wide-Area Network (WAN), the Internet, or any other suitable network. Further, the connection between the ATMs 202(1)-(N), the mobile devices 204(1)-(N), and the banking services 206(1)-(N), and the communication network(s) 208 may be a wireless connection (e.g., Bluetooth, Wi-Fi connection, etc.), or a wired connection (e.g., Ethernet, universal serial bus (USB), etc.), or a combination thereof.

As illustrated in FIG. 2, the ATM 202(1) may include an operating system 210(1), outage component 212(1), a display 214(1), one or more controls 216(1), a card reader 218(1), a cash dispenser 220(1) connected to a safe 221(1), a deposit slot 222(1) connected to the safe 221(1), a power transfer interface 226(1), a rechargeable power source 228(1), communication interfaces 230(1), and one or more input/output devices 232(1). Further, the ATMs 202(1)-(N) may be placed at various geographic locations to provide automated teller services to customers (e.g., the users 205(1)-(N)) of the banking services 206(1)-(N).

As illustrated in FIG. 2, the outage component 212(1) may include a management component 234(1), an authentication component 236(1), an authorization component 238(1), a transaction recordation component 240(1), an outage transaction history 242(1), and a dispenser controller 244(1) for instructing the cash dispenser 220 to disburse cash funds from the safe 221. The management component 234 may be configured to administer the ATM 202 in the outage mode. For instance, the management component 234 may be configured to receive transaction requests 246(1)-(N) from the mobile devices 204(1)-(N), send transaction responses 248(1)-(N) to the mobile devices 204(1)-(N), send service requests 250(1)-(N) to the mobile devices 204(1)-(N) and the banking services 206(1)-(N), receive service responses 252(1)-(N) from the mobile devices 204(1)-(N) and the banking services 206(1)-(N), and send and receive outage information 255(1)-(N) from other ATMs 202(2)-(N), the mobile devices 204(1)-(N), and the banking services 206(1)-(N).

The outage information 255(1)-(N) may include status information of different ATMs 202 in the outage mode, and a record of transactions performed at ATMs 202 in the outage mode. Further, the ATMs 202(1)-(N), the mobile devices 204(1)-(N), and the banking services 206(1)-(N) may distribute the outage information 255 amongst each other to update the customer information 256 and the ATM information 258, and prevent the ATMs 202(1)-(N) from overdrafting the financial accounts 260 of the users 205(1)-(N).

In some embodiments, an individual transaction request 246 may include a transaction type identifier identifying the type of financial transaction to perform, one or more financial accounts identifiers identifying the financial accounts associated with the requested financial transaction, and/or an amount of cash funds associated with the transaction request. Further, an individual transaction request may include an authentication credential associated with the one or more financial accounts, a banking application, and/or a banking service.

Further, in some embodiments, the management components 234 may generate transaction responses 248 in response to the transaction requests 246. An individual transaction response 248 may identify a corresponding transaction request 246 and indicate whether the transaction request 246 was completed by the ATM 202. Additionally, the management component 234 may send the transaction response 248 to the mobile device 204. For example, the management component 234(1) may receive the transaction request 246(1) from the mobile device 204(1), and send the corresponding transaction response 248(1) to the mobile device 204(1).

In some embodiments, the management component 234(1) may send the service requests 250(1)-(N) to the mobile devices 204(1)-(N) or the banking services 206(1)-(N). As described herein, a service request 250 may include at least one of an authentication request, an authorization request, or an account balance request. Further, the management component 234(1) may send a service request 250 when processing a transaction request 246. For instance, the management component 234(1) may endeavor to offload an authorization process associated with a transaction request 246(1) to a banking service 206(1). As such, the management component 234(1) may send the service request 246(1) to the banking service 206(1). Further, the banking services 206(1)-(N) may send the service responses 252(1)-(N) in response to the service requests 250(1)-(N). For instance, the banking service 206(1) may send the service response 252(1) including an authorization result to the management component 234(1) in response to the service request 250(1).

In some embodiments, in order to conserve battery power of the rechargeable power source 228, the management component 234(1) may request that the mobile device 204(1) send the service request 250(1) to the banking service 206(1) and receive the service response 252 from the banking service 206. Once the mobile device 204(1) receives the service response 252(1), the mobile device 204(1) may forward the service response 252(1) to the management component 234(1).

The authentication component 236(1) may be configured to authenticate at least one of the mobile devices 204(1)-(N), the users 205(1)-(N) in possession of the mobile devices 204(1)-(N), or the banking applications 264(1)-(N). For instance, the authentication component 236(1) may be configured to receive authentication information from a mobile device 204 in the transaction request 246(1), and verify the authentication information. Some examples of authentication information include a PIN code, username/password combination, cryptographic information, biometric information (e.g., voice signatures, fingerprints, retinal or iris information, and facial information), or the authentication credential 262(1). In some embodiments, the PIN code or biometric information may be captured by the controls 216(1) or the I/O devices 232(1) of the ATM 202(1). In some other embodiments, the PIN code or biometric information may be captured by the banking application 264(1), and provided to the authentication component 236(1) via the communication network 208.

Additionally, or alternatively, as described above, the authentication component 236(1) may rely on an authentication result determined by the banking application 264(1), or the authentication component 266(1) of the banking service 206(1). For example, in order to conserve the battery power of the rechargeable power source 228(1), the management component 234(1) may send the service request 250(1), requesting remote authentication of the mobile device 204(1) or the user 205(1), to the authentication component 266(1) of the banking service 206(1).

In some embodiments, the service request 250(1) may include the authentication credential 262(1). Upon receipt of the service request 250(1), the authentication component 266(1) may authenticate the mobile device 204(1) or the user 205(1) using authentication information. For instance, the authentication component 266(1) may verify the authentication credential 262(1) based on the customer information 256 (e.g., the financial account 260(1)) associated with the user 205(1). Further, the banking service 206(1) may send the service response 252(1) including the authentication result to the ATM 202(1).

The authorization component 238(1) may be configured to authorize the transaction requests 246(1)-(N) received from the mobile devices 204(1)-(N). For instance, the authorization component 238(1) may be configured to receive the transaction request 246(1) from the mobile device 204(1). Further, the transaction request 246(1) may request that the ATM 202(1) disburse a specified amount of cash funds via the cash dispenser 220. In response to the transaction request 246(1), the authorization component 238(1) may determine whether the transaction request is an authorized transaction. In some embodiments, the authorization component 238 may determine whether the transaction request 246(1) is an authorized transaction based at least on at least one of the outage transaction history 242, an outage withdrawal limit associated with the user 205(1) or the ATM 202(1), or customer information 256 associated with the user 205(1).

Additionally, or alternatively, as described herein, the authorization component 238(1) may rely on an authorization result determined by the banking application 264(1), or the authorization component 268(1) of the banking service 206(1). For instance, in order to conserve the battery power of the rechargeable power source 228(1), the management component 234(1) may send the service request 250(1), requesting remote authorization of the transaction request 246(1), to the authorization component 268 of the banking service 206. Upon receipt of the service request 250(1), the authorization component 268(1) may determine an authorization result based on at least one of the customer information 256(1), the ATM information 258, or the outage information 255.

As an example, the authorization component 266(1) may authorize the transaction request 246(1) based at least in part on the account balance of the financial account 260(1) associated with the user 205(1) being greater than the requested withdrawal funds of the transaction request 246(1). Further, the banking service 206 may send the service response 252 including the authorization result to the ATM 202(1). In some other examples, the authorization component 266(1) may deny the transaction request 246(1) based at least in part on the account balance of the financial account 260(1) associated with the user 205(1) being lesser than the requested withdrawal funds of the transaction request 246(1). In yet still some other examples, the authorization component 266(1) may deny the transaction request 246(1) based on the sum of the requested withdrawal amount and previous outage mode transactions being greater than or equal to an outage withdrawal limit associated with the financial account 260(1) associated with the user 205(1) or the ATM profile 270(1) associated with the ATM 202(1).

The transaction recordation component 240 may be configured to generate the outage transaction history 242. In some embodiments, the outage transaction history 242 may include a log of the transactions performed by the outage component 212. For example, the transaction recordation component 240(1) may create a log entry indicating that a transaction request 246(1) was received from the user 205(1), and whether the transaction request 246(1) was approved or denied. In some examples, the outage transaction history 242 may be a distributed ledger (e.g., a blockchain), and individual outage mode transactions performed by the ATMs 202(1)-(N) may be recorded as entries (e.g., blockchain blocks) in the distributed ledger.

For instance, in response to a cash funds withdrawal by the user 205(1) at the ATM 202(1) in the outage mode, the transaction recordation component 240(1) may generate a blockchain block by performing a cryptographic algorithm using the transaction request 246(1), the authorization result associated with the transaction request 246(1), and a previous state of a blockchain recording outage mode transactions performed by the outage component 212 or within the access system 200. Further, the transaction recordation component 240(1) may add the block chain block to the blockchain Additionally, the transaction recordation component 240 may distribute the outage transaction history 242 to the other electronic devices within the access system (e.g., the ATMs 202(1)-(N), the other mobile devices 204(2)-(N), and the banking services 206(1)-(N)) as the outage information 255. As described herein, in some embodiments, the electronic devices within the access system may use the outage transaction history 242 when authorizing requested transactions. For instance, the ATM 202(2) may receive the outage transaction history 242(1) including an entry representing a cash withdrawal made by the user 205(1) for the outage withdrawal limit. In response, the ATM 202(2) may deny a subsequent withdrawal transaction by the user 205(1) based at least in part on the outage transaction history 242(1) indicating that the user 205(1) has reached the outage withdrawal limit.

As illustrated in FIG. 2, the mobile device 204(1) may include an operating system 272(1), a banking application 264(1), a display 274(1) (e.g., a touch screen), input/output (I/O) devices 276(1) (e.g., a camera, a speaker, sensors, etc.), a battery device 278(1) configured to supply power to the mobile device 204(1), and a power transfer interface 280(1) configured to send power to another device from the battery device 278(1) or receive power from another device (e.g., the ATM 202(1)) and provide the power to the battery device 278(1).

The operating system 272(1) may be an application program configured to manage the basic functions of the mobile device 204(1). Some examples of the operating system 272(1) may include Google's Android™ operating system, Microsoft's Windows™ operating system, Apple's Mac OS/X® or iOS operating systems, some variety of the Linux operating system, or the like. The operating system 272(1) may be configured to schedule tasks, manage storage of data on the ATM, provide common services to the components and applications of the mobile device 204(1), or communicate with peripheral devices associated with the mobile device 204(1). Further, in some embodiments, the banking application 264(1) executing on the operating system 272 may provide a user interface for performing financial transactions via the mobile device 204(1).

As illustrated in FIG. 2, the banking application 264(1) may include authentication credential 262(1) that may be used to identify at least one of the mobile device 204(1), the user 205(1), the banking application 264, or a financial account 260(1) associated with at least one of the mobile device 204(1), the user 205(1), or the banking application 264(1). In some instances, the authentication credentials 262(1)-(N) may include cryptographic information (e.g., digital signature, cryptographic tokens) or based on cryptographic secret (e.g., a digital certificate, cryptographic key, etc.). Further, the authentication credential 262(1) may also be used to verify the authenticity of the operating system 272(1) or the banking application 264(1).

In some embodiments, the banking application 264(1) may generate an authentication credential in response to a successful authentication by the user 205(1) to the banking application 264(1). In some other embodiments, the banking application 264(1) may receive an authentication credential 262(1) from one of the banking services 206 in response to a successful authentication.

Further, the ATMs 202(1)-(N), banking services 206(1)-(N), or banking application 264(1) may deny a request of the user 205(1) to perform a financial transaction based upon authentication credential 262. For example, the ATM 202(1) may deny a requested financial transaction based upon the authentication credential 262 indicating that the banking application 264(1) that requested the financial transaction has been compromised. As another example, the ATM 202(1) may determine that a requested financial transaction is unauthorized based on the financial account 260 associated with the authentication credential 262(1). For instance, the ATM 202(1) may identify the financial account 260(1) associated with the authentication credential 262(1), and reject a requested transaction based upon the financial account being locked due to suspicious or fraudulent activity at the ATM 202(1). In yet another example, the ATM 202(1) may deny a requested financial transaction based upon a timestamp associated with the authentication credential 262(1), or one or more indicators that the authentication credential 262(1) has been tampered with or altered.

Further, the banking application 264 may include user preferences 282 including one or more configuration settings of the banking application 264. In some embodiments, the user preferences 282 may include an outage withdrawal limit that limits the amount of cash funds a user 205 may withdraw from any of the ATMs 202 in outage mode. In some embodiments, the outage withdrawal limit may be associated with a pre-determined period of time. As an example, the outage withdrawal limit may correspond to an amount of funds that a user 205 may withdraw over the course of a twenty-four hour of period. In some other embodiments, the outage withdrawal limit may correspond to the account balance of a financial account 260 associated with a user 205. For example, the outage withdrawal limit may be a percentage of the last known account balance of the financial account. In yet still some other embodiments, the outage withdrawal limit may be set by the user 205 or the banking service 206.

Further, in some embodiments, the user preferences 282 may include an outage funds transfer limit that limits the amount of cash funds a user 205 may transfer between financial accounts using any of the ATMs 202 in outage mode. In some embodiments, the outage funds transfer limit may be associated with a pre-determined period of time. As an example, the outage funds transfer limit may correspond to an amount of funds that a user 205 may transfer over the course of a twenty-four hour of period. In some other embodiments, the outage funds transfer limit may correspond to the account balance of a financial account 260 associated with a user 205. For example, the outage funds transfer limit may be a percentage of the last known account balance of the financial account. In yet still some other embodiments, the outage funds transfer limit may be set by the user 205 or the banking service 206.

As illustrated in FIG. 2, a banking application 264 may include an outage client 284 configured to manage supplying power from a mobile device 204(1) to an ATM 202(1) via a power transfer interface 226(1), and present a user interface for performing financial transactions with an ATM 202 in an outage mode. For instance, in some embodiments, the outage client 284 may be configured to indicate that the ATM 202(1) needs to be recharged, and provide instructions for supplying power to the ATM 202(1) using the mobile device 204(1).

Additionally, the outage client 284 may be configured to authenticate at least one of the mobile device 204(1), user 205(1), or banking application 264 to the ATMs 202(1)-(N) or the banking services 206(1)-(N) using the authentication credentials 262. Further, the outage client 284 may present an interface for selecting and completing financial transactions at an ATM 202 in the outage mode. In addition, the outage client 284 may capture visual information (e.g., photographic information or video information) about the user 205. In some embodiments, the visual information may be used during a biometric authentication process to ensure that an authorized user is requesting completion of a financial transaction. Additionally, or alternatively, the visual information may be used for investigative purposes to determine the identity of an unauthorized user that completed a fraudulent transaction.

Further, as illustrated in FIG. 2, an outage client 284 may include a transaction recordation component 286 configured to generate the outage transaction history 288. In some embodiments, the outage transaction history 288 may include a log of the transactions associated with the outage client 284. For example, a transaction recordation component 286 may create a log entry indicating that a transaction request 246(1) was received from the user 205(1), and whether the transaction request 246(1) was approved or deny.

In some examples, an outage transaction history 288 may be a distributed ledger (e.g., a blockchain) and individual transactions performed in the outage mode by the ATMs 202(1)-(N) may be recorded as entries (e.g., blockchain blocks) in the distributed ledger. For instance, in response to a cash funds withdrawal by the user 205(1) at the ATM 202(1) in an outage mode, the transaction recordation component 286 may generate a blockchain block by performing a cryptographic algorithm using the transaction request, the authorization result associated with the transaction request to withdraw the cash funds, and a previous state of a blockchain recording outage mode transactions performed by the outage client 284 or within the access system 200. Further, the transaction recordation component 286 may add the block chain block to the blockchain Additionally, a transaction recordation component 286 of an example embodiment may distribute the outage transaction history 288 to the other electronic devices within the access system (e.g., the ATMs 202(1)-(N), the other mobile devices 204(2)-(N), and the banking services 206(1)-(N)). Further, in some embodiments, the electronic devices within the access system may use the outage transaction history 288 when authorizing requested transactions. For instance, the ATM 202(2) may receive the outage transaction history 288(1) including an entry representing a cash withdrawal made by the user 205(1) for the outage withdrawal limit of the ATM 202(2). In response, the ATM 202(2) may deny a subsequent withdrawal transaction by the user 205(1) based at least in part on the outage transaction history 288(1) indicating that the user 205(1) has reached the outage withdrawal limit.

Further, the mobile devices 204(1)-(N) may distribute the outage transaction history 288 as the outage information 255 via the communication networks 208. For example, in some embodiments, the communication networks 208 may include a mesh network formed by the ATMs 202(1)-(N) and the mobile devices 204(1)-(N). Further, the ATMs 202(1)-(N) and the mobile devices 204(1)-(N) may distribute the distribution information 255 via the mesh network of the communication networks 208.

As illustrated in FIG. 2, the banking service 206(1) may include the authentication component 266 configured to authenticate the ATMs 202(1)-(N), the mobile devices 204(1)-(N), and the users 205(1)-(N) and the authorization component 268 configured to authorize ATM transactions. Further, the banking service 206(1) includes a transaction service 290, customer information 256, and ATM information 258. The transaction service 290 may be configured to manage transaction activity at ATMs 202 associated with the banking service 206. For instance, the transaction service 290(1) may utilize the authentication component 266 and the authentication component 268 to approve or deny transaction requests 246(1) submitted to ATMs 202 operated by a financial institution associated with the banking service 206. Further, the transaction service 290 may update the customer information 256 and ATM information 258 based upon the transaction activity of the ATMs 202 associated with the banking service 206. For example, the transaction service 290 may receive the outage information 255(1) indicating that the user 205(1) has made cash withdrawals of a particular amount of cash funds from the ATM 202(1). Further, the transaction service 290 may update the financial account 260(1) associated with the user 205(1) and the ATM profile 270(1) associated with the ATM 202(1) to reflect the withdrawal transaction.

Additionally, in some embodiments, the transaction service 290 may monitor the ATMs 202 in the outage mode, and notify the users 205(1)-(N) via the banking applications 264(1)-(N) of recommended locations for obtaining cash funds based on location information associated with the users 205(1)-(N) and ATMs 202(1)-(N), or the cash balances of the safes 221 of the ATMs in the outage mode. In addition, in some embodiments, the banking service 206(1) may determine that the ATM 202(1) performed an outage mode transaction for an account associated with a user 205(2) associated with another banking service 206(2) based on the outage information 255(1). In response, the banking service 206(1) may request that the banking service 206(2) transmit the funds disbursed to the user 205(2) to the banking service 206(1).

In some embodiments, customer information 256 may include information about the users 205(1)-(N) and the mobile devices 204(1)-(N). As illustrated in FIG. 2, the customer information 256 may include financial accounts 260(1)-(N) corresponding to users 205(1)-(N) having financial accounts with the financial institution associated with the banking service 206(1). In certain embodiments, the financial accounts 260(1) include account balance information, financial transaction history, location information, user activity, user roles, user workflows, user settings, authentication information, encryption information, authorization information, biographical information, demographic information, special needs and disabilities, executed service agreements, contact information, etc.

In some embodiments, ATM information 258 may include information about the ATMs 202(1)-(N). As illustrated in FIG. 2, ATM information 258 may include ATM profiles 270(1)-(N) corresponding to the ATMs 202(1)-(N). For example, the first ATM profile 270(1) is associated with the first ATM 202(1), the nth ATM profile 270(N) is associated with the nth ATM 202(N), and so forth. In certain embodiments, the ATM profiles 270 include a safe cash balance, a power status, an outage mode status, an outage withdrawal limit, an outage funds transfer limit, financial transaction history, outage transaction history, location information, security information, encryption information, etc.

Figure 3:
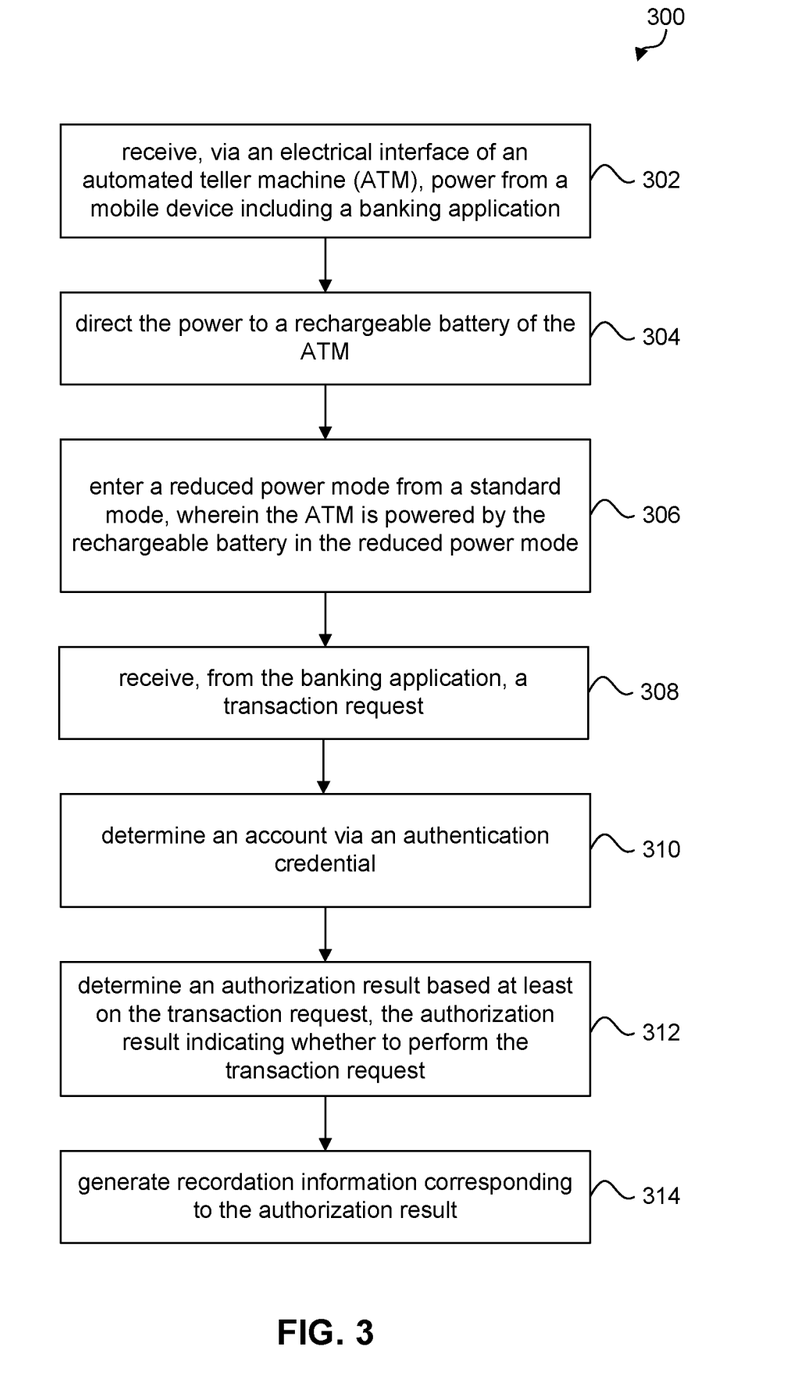
FIG. 3 is a flowchart illustrating a process implemented by a system for implementing ATM access during a power outage, according to embodiments of the present disclosure.

FIG. 3 is a flowchart illustrating a process for implementing ATM access during a power outage, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed in all embodiments. Further, some of the steps may be performed simultaneously, or in a different order than shown in FIG. 3, as will be understood by a person of ordinary skill in the art.

Method 300 shall be described with reference to FIGS. 1 and 2. However, method 300 is not limited to those example embodiments.

In 302, an ATM may receive, via an electrical interface, power from a mobile device including a banking application. For example, the user 205(1) may facilitate a power transfer interaction between a mobile device 204(1) including a banking application 264(1) and an ATM 202(1). Further, the mobile device 204(1) may transmit the power to the ATM 202(1) via a power transfer interfaces 226(1) and 280(1). In some embodiments, power transfer interfaces 226(1) and 280(1) may include wireless charging interfaces, and the power transfer interface 280(1) may wirelessly supply power to the power transfer interface 226(1). Additionally, or alternatively, the power transfer interfaces 226(1) and 280(1) may include wired interfaces, and the power transfer interface 140 may supply power to the power transfer interface 134 via a wired connection. In some other examples, the user 205(1) may facilitate a power transfer interaction between a portable power source and the ATM 202(1).

In 304, the ATM may direct the power to a rechargeable battery of the ATM. For example, a power transfer interface 226(1) of an ATM 202(1) may send the power received from a battery device 278(1) of the mobile device 204(1) to a rechargeable power source 228(1) of the ATM 202(1).

In 306, the ATM may enter, by the ATM, a reduced power mode from a standard mode, which could be based, for example, on an outage status of the ATM, wherein the ATM is powered by the rechargeable battery in the reduced power mode. For example, the ATM 202(1) may operate in an outage mode under control of the outage component 212(1) based upon an electrical outage 108. In some embodiments, the outage component 212(1) may offload functionality of the ATM 202(1) to the mobile device 204(1) or the banking service 206(1) in the outage mode.

In 308, the ATM may receive a transaction request including an authentication credential. For example, the ATM 202(1) may receive a transaction request 246(1) from the mobile device 204(1). As described herein, the transaction request 246(1) may correspond to a financial transaction the user 205(1) endeavors to perform at the ATM 202(1). In some embodiments, a transaction request 246(1) may include a transaction type identifier, an amount of cash funds associated with the transaction request, and/or an authentication credential 262(1) associated with the financial account 260(1) and/or the banking application 264(1) requesting the financial transaction.

For instance, the transaction request 246(1) may include an identifier for a cash withdrawal and specify that the user 205(1) would like to withdraw six hundred dollars. Further, the transaction request 246(1) may include the authentication credential 262(1) associated with the financial account 260(1) and/or the banking application 264(1).

In 310, the ATM may determine an account associated with the authentication credential. For example, the outage component 212(1) may determine that the financial account 260(1) is associated with the transaction request 246(1) based on the authentication credential 262(1).

In 312, the ATM may determine an authorization result based on the transaction request, the authorization result indicating whether to perform the transaction request. For example, an authorization component 238(1) may determine whether ATM 202(1) should complete the transaction request 246(1). In some embodiments, the authorization component 238(1) may determine whether to perform the transaction request 246(1) based on a withdrawal limit or a funds transfer limit associated with the user 205 or the ATM 202(1). The withdrawal limit or the funds transfer limit may be a standard-operating limit associated with the financial account 260(1), financial institution, ATM 202(1), etc. Additionally, or alternatively, the withdrawal limit may be an outage-specific limit associated with the financial account 260(1), financial institution, ATM 202(1), etc. As an example, if the withdrawal limit is nine hundred dollars and the user 205 has already withdrawn six hundred dollars, the authorization component 238 may deny the transaction request 246(1) as its performance would put the user 205 over the outage withdrawal limit (e.g., if the request is for an additional six hundred dollars). Further, the ATM 202(1) may perform the transaction request 246(1) based on the authorization result. For instance, if the authorization result indicates that a withdrawal transaction should be performed, the ATM 202(1) may disburse cash funds via the cash dispenser 220(1)

In some other embodiments, outage component 212 may receive the authorization result from outage client 284(1) or authorization component 268(1). As an example, the management component 234 may send a service request 246(1) including the transaction request 246(1) to the banking service 206(1). In response, the authorization component 236(1) of the banking service 206(1) may determine an authorization result, and return the authentication result to the ATM 202(1) in the service response 252(1).

In 314, the ATM may generate recordation information corresponding to the authorization result. For example, the transaction recordation component 240 may create outage transaction history 242(1) indicating that the transaction request 246(1) was received from the user 205(1) and denied due to the outage withdrawal limit. In some embodiments, the outage transaction history 242(1) may be a distributed ledger. As such, the transaction recordation component 240 may generate a ledger entry indicating that the transaction request 246(1) was received from the user 205(1) and denied due to the outage withdrawal limit. Further, the transaction recordation component 240 may add the ledger entry to the outage transaction history 242(1).

Figure 4:
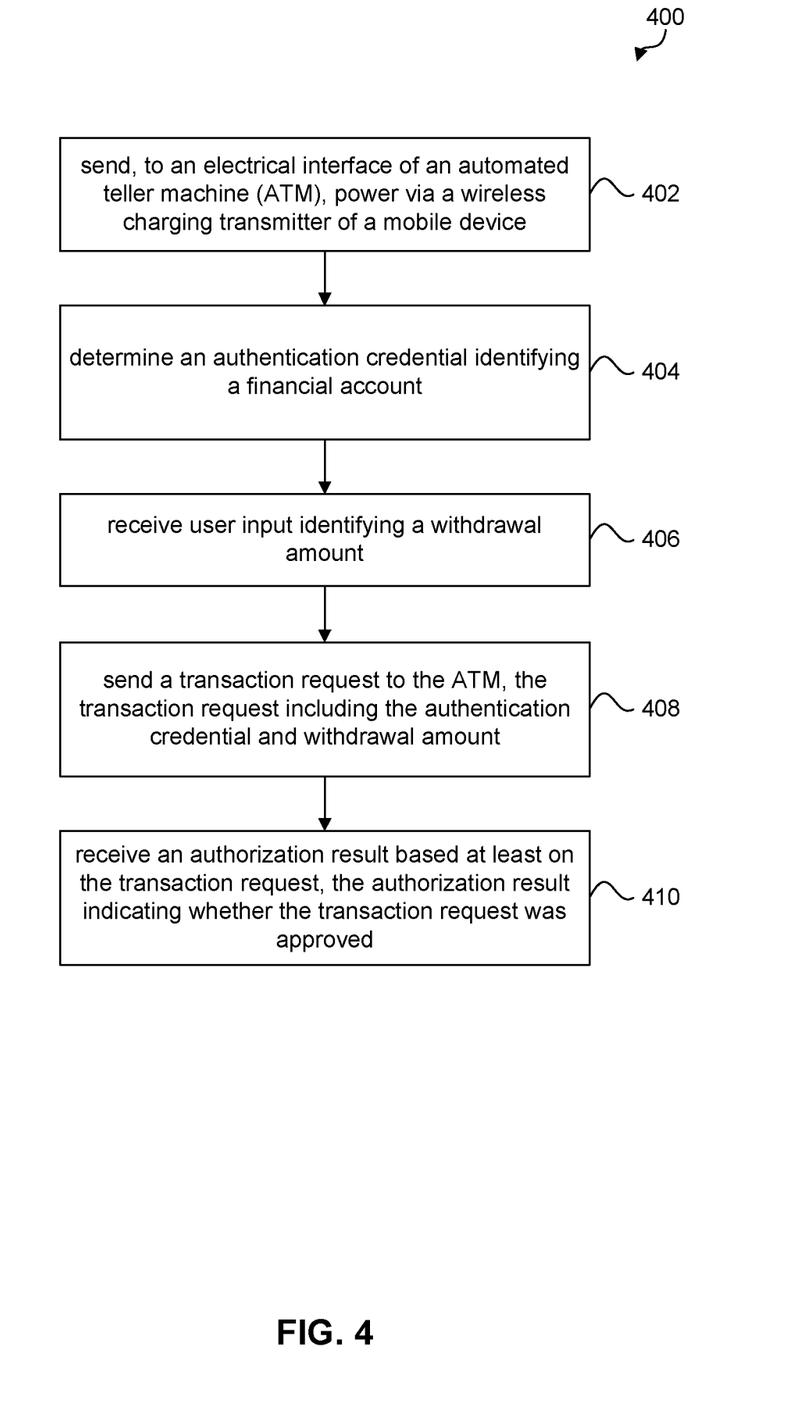
FIG. 4 is a flowchart illustrating a process implemented by a system for implementing ATM access during a power outage, according to embodiments of the present disclosure.

FIG. 4 is a flowchart illustrating a process for implementing ATM access during a power outage, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1 and 2. However, method 400 is not limited to those example embodiments.

In 402, a mobile device may send, to an electrical interface of the automated teller machine, power via a wireless charging transmitter of a mobile device. For example, a user 205 may utilize a mobile device 204(1) including a banking application 264(1) to charge a rechargeable power source 228(1) of an ATM 202(1). In some embodiments, the mobile device 204(1) may transmit the power to the ATM 202(1) via a wired or wireless charging interface 280(1).

For instance, the user 205 may place the mobile device 204(1) in contact with or in close proximity to the power transfer interface 134. In some other instances, the user 205 may create a USB-C connection between the ATM 202(1) and the mobile device 204(1) via a USB-C cable connected to the power transfer interface 226(1) of the ATM 202(1) and the power transfer interface 280(1) of the mobile device 204(1).

In 404, the mobile device may determine, by a banking application installed on the mobile device, an authentication credential identifying a financial account. For example, in some embodiments, the banking application 264(1) may generate the authentication credential 262(1) in response to authenticating the user 205(1). In some other examples, the banking application 264(1) may receive the authentication credential 262(1) from the banking service 206(1) in response to the user 205(1) providing valid authentication information (e.g., username/password combination) to an authentication component 266(1).

As described herein, the authentication credential 262(1) may identify a financial account of the user 205(1) and the banking application 264(1). Further, the authentication credential 262(1) may identify that the banking application 264(1) has not been compromised or otherwise tampered with. Additionally, or alternatively, the authentication credential 262(1) may identify that the banking application 264(1) is associated with a financial institution having a financial account authorized to perform outage mode transactions at the ATM 202(1).

In 406, the mobile device may receive user input identifying a withdrawal amount. For example, the banking application 264(1) may present a GUI via the display 274(1). Further, the banking application 264(1) may capture user input, via the GUI, specifying an amount of cash funds to withdraw from the financial account 260(1) associated with the user 205(1).

In some other examples, the banking application 264(1) may request and receive the user input via other interfaces of the mobile device 204(1). For instance, the banking application 264(1) may request the withdrawal amount via an audible notification reproduced by speakers of the mobile device 204(1), and capture user input defining the withdrawal amount using a microphone of the mobile device 204(1).

In 408, the mobile device may send, via the banking application, a transaction request to the ATM, the transaction request including the authentication credential and withdrawal amount. For example, the mobile device 204(1) may send the transaction request 246(1) to the ATM 202(1). Further, the transaction request 246(1) may include the authentication credential 262(1) and specify that the user 205(1) would like to withdraw the withdrawal amount from the financial account 260(1) associated with the authentication credential 262(1).

In some other examples, the mobile device 204(1) may send the authentication credential 262(1) and the transaction request 246(1) separately. For instance, the mobile device 204(1) may send the authentication credential 262(1) to the ATM 202(1) for verification in a first communication, and send the transaction request 246(1) to the ATM 202(1) in a second communication based upon the successful verification of the authentication credential 262(1) by the ATM 202(1).

In 410, the mobile device may receive an authorization result based on the transaction request, the authorization result indicating whether the ATM approved the transaction request. For example, the mobile device 204(1) may receive the transaction response 248(1) from the ATM 202(1).

Further, the transaction response 248(1) may indicate whether the transaction request was approved or denied.

Figure 5:
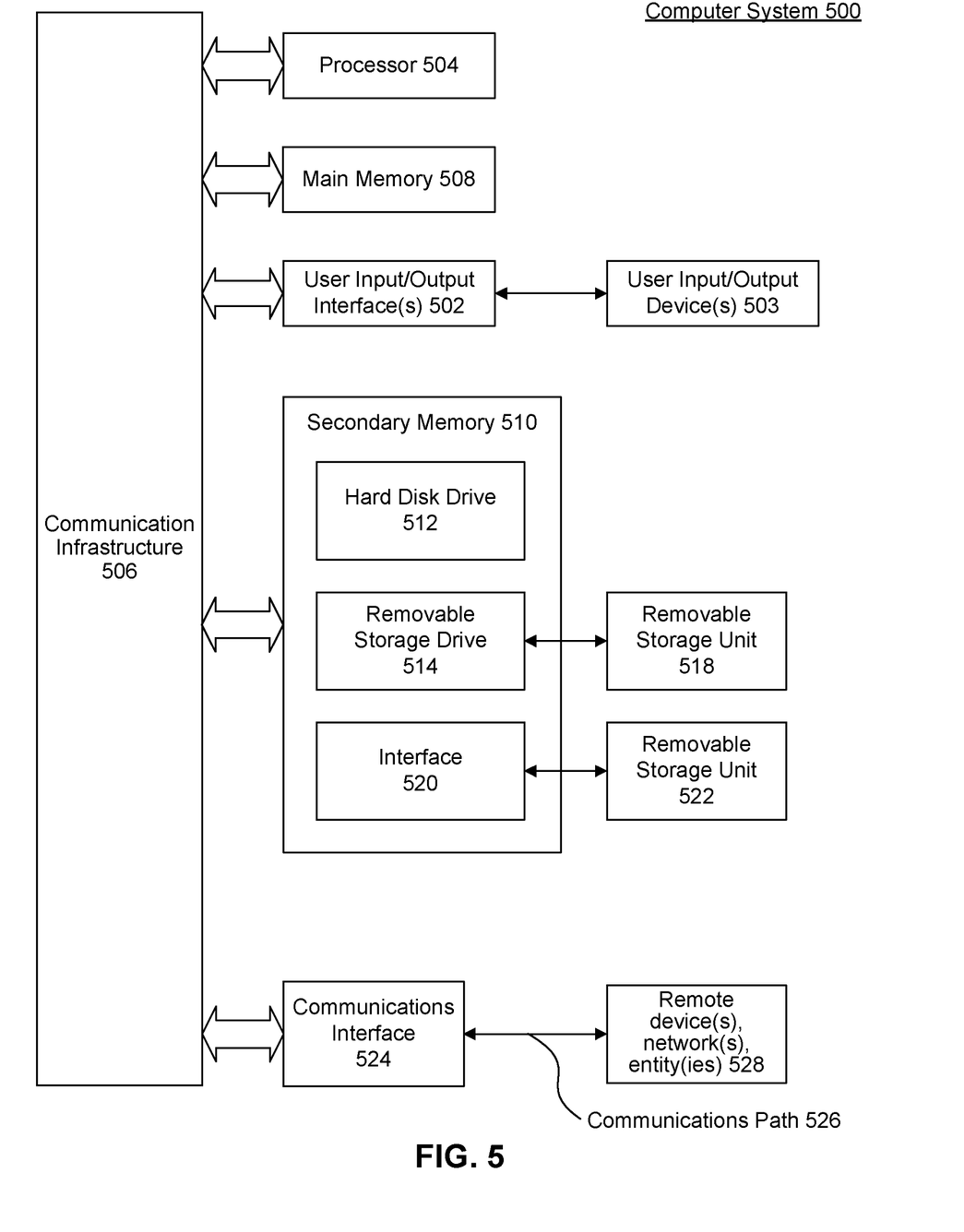
FIG. 5 illustrates a computer system, according to example embodiments of the present disclosure.

FIG. 5 is a block diagram of example components of system 500. To implement one or more example embodiments, one or more systems 500 may be used, or one or more components thereof, for example, to implement embodiments discussed herein, as well as combinations and sub-combinations thereof. System 500 may include one or more processors (also called central processing units, or CPUs), such as a processor 504. Processor 504 may be connected to a communication infrastructure or bus 506.

System 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

System 500 may also include a main or primary memory 508, such as random access memory (RAM). Main memory 508 may include one or more levels of cache. Main memory 508 may have stored therein control logic (i.e., computer software) and/or data.

System 500 may also include one or more secondary storage devices or memory 510. Secondary memory 510 may include, for example, a hard disk drive 612 and/or a removable storage device or drive 514.

Removable storage drive 514 may interact with a removable storage unit 518. Removable storage unit 518 may include a computer usable or readable storage device having stored thereon computer software (control logic) and/or data. Removable storage unit 518 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 514 may read from and/or write to removable storage unit 518.

Secondary memory 510 may include other means, devices, components, instrumentalities or other approaches for allowing computer programs and/or other instructions and/or data to be accessed by system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

System 500 may further include a communication or network interface 524. Communication interface 524 may enable system 500 to communicate and interact with any combination of external devices, external networks, external entities, etc. (individually and collectively referenced by reference number 528). For example, communication interface 524 may allow system 500 to communicate with external or remote devices 528 over communications path 526, which may be wired and/or wireless (or a combination thereof), and which may include any combination of LANs, WANs, the Internet, etc. Control logic and/or data may be transmitted to and from system 500 via communication path 526.

System 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms. In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, system 500, main memory 508, secondary memory 510, and removable storage units 518 and 522, as well as tangible articles of manufacture embodying any combination of the foregoing. Such control logic, when executed by one or more data processing devices (such as computer system 600), may cause such data processing devices to operate as described herein.

It is to be appreciated that the Detailed Description section, and not Abstract section, is intended to be used to interpret the claims. The Abstract section may set forth one or more but not all example embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described example embodiments, but should be defined only in accordance with the following claims and their equivalents.

What is claimed is:

1. A method, comprising:
   detecting that an automated teller machine (ATM) is in an outage mode;

transmitting a message indicating that the ATM is in the outage mode to a mobile device based on a location of the mobile device with respect to the ATM, wherein the mobile device is prompted to provide power to the ATM in response to receiving the message;

receiving, via an electrical interface of the ATM, power from the mobile device executing a banking application, wherein the ATM includes a first display and the mobile device includes a second display;

entering a reduced power mode, wherein the ATM is powered by a rechargeable battery in the reduced power mode; and while in the reduced power mode:
preventing use of the first display of the ATM;
receiving, from the banking application, a transaction request; and
providing an authorization result via the second display of the mobile device in response to the ATM being prevented from utilizing the first display.

2. The method of claim 1, wherein receiving the transaction request comprises: (i) receiving a withdrawal request for a first specified amount of cash funds, (ii) receiving a deposit request for a second specified amount of cash funds, (iii) receiving a funds transfer request between an account and another account, or (iv) receiving an account balance request associated with the account.

3. The method of claim 2, wherein determining the authorization result comprises comparing the first specified amount to an outage withdrawal limit.

4. The method of claim 1, further comprising completing the transaction request based at least in part on the authorization result.

5. The method of claim 1, wherein receiving the transaction request comprises receiving a withdrawal request for a specified amount of cash funds, and wherein determining the authorization result comprises:
requesting, from the banking application or a banking service, an account balance associated with an account; and
comparing the specified amount of cash funds to the account balance and to a cash balance associated with a safe of the ATM.

6. The method of claim 1, wherein determining the authorization result comprises:
sending, via the mobile device, the transaction request to a banking service;
receiving, via the mobile device, the authorization result from the banking service.

7. The method of claim 1, further comprising:
generating a blockchain block by performing a cryptographic algorithm using the transaction request, the authorization result, and a first blockchain;
adding the blockchain block to the first blockchain to generate a second blockchain; and distributing the second blockchain to an electronic device associated with the first blockchain.

8. The method of claim 7, wherein the electronic device is the mobile device.

9. The method of claim 7, wherein the electronic device is a device other than the mobile device.

10. The method of claim 1, wherein receiving the power from the mobile device comprises receiving the power from a wireless charging transmitter of the mobile device.

11. A non-transitory computer-readable device having instructions stored thereon that, when executed by at least one computing device, cause the at least one computing device to perform operations comprising:

detecting that an automated teller machine (ATM) is in a power outage mode;

transmitting a message indicating that the ATM is in the power outage mode to the at least one computing device based on a location of the at least one computing device with respect to the ATM, wherein the at least one computing device is prompted to provide power to the ATM in response to receiving the message;

sending, to an electrical interface of the ATM, power via a wireless charging transmitter of the at least one computing device, wherein the ATM includes a first display and the at least one computing device includes a second display;

entering a reduced power mode, wherein the ATM is powered by the wireless charging transmitter while in the reduced power;

preventing use of the first display;

sending a transaction request to the ATM; and providing an authorization result via the second display of the at least one computing device in response to the ATM being prevented from utilizing the first display.

12. The non-transitory computer-readable device of claim 11, the operations further comprising generating transaction information corresponding to the transaction request, the authorization result, or both.

13. The non-transitory computer-readable device of claim 12, the operations further comprising:
joining a mesh network; and
sending, via the mesh network, the transaction information to a banking service, to a mobile device, or to both.

14. The non-transitory computer-readable device of claim 11, wherein the ATM is a first ATM, and the operations further comprising:
receiving a request for transaction information from the first ATM; and
sending the transaction information to the first ATM, the transaction information including a record of a financial transaction performed by a second ATM in the reduced power mode.

15. The non-transitory computer-readable device of claim 11, the operations further comprising:
forwarding, to a banking service, an account balance request received from the ATM; and
forwarding, to the ATM, account balance information received from the banking service, the account balance information including a current balance of a financial account.

16. The non-transitory computer-readable device of claim 11, the operations further comprising displaying a graphical indicator associated with the authorization result.

17. A system comprising:
a memory;
a wireless charging receiver;
a rechargeable battery;
a first display;
a communication interface; and
one or more processors and/or circuits coupled to the memory and configured to:
receive, via the wireless charging receiver, power from a mobile device including a banking application, wherein the mobile device includes a second display and wherein the mobile device receives a message including a status of the system based on a location of the mobile device with respect to the system, the status indicating that the system is in an outage mode, and wherein the mobile device is prompted to provide power to an automated teller machine (ATM) in response to receiving the message;
enter a reduced power mode, wherein the ATM is powered by the mobile device the reduced power mode;
prevent use of the first display;
receive, from the banking application, a transaction request associated with a financial account;
provide an authorization result via the second display in response to being prevented from utilizing the first display.

18. The system of claim 17, wherein the one or more processors and/or circuits are further configured to:
generate transaction information by:
generating a distributed ledger including a record of the transaction request, of the authorization result, or of both; and
sending the distributed ledger to an electronic device associated with the distributed ledger.

19. The system of claim 17, wherein to determine the authorization result, the one or more processors and/or circuits are further configured to:
determine an outage withdrawal limit;
determine a requested withdrawal amount associated with the transaction request, and compare the requested withdrawal amount to the outage withdrawal limit.

20. The system of claim 17, wherein to determine the authorization result, the one or more processors and/or circuits are further configured to:
send, via the mobile device, a withdrawal request to a banking service;
receive, via the mobile device, the authorization result from the banking service.

21. The system of claim 17, further comprising a safe including cash funds, and wherein the one or more processors and/or circuits are further configured to send the transaction information to a banking service, the banking service configured to monitor an outage status of the system and a cash balance of the safe.

22. The system of claim 17, wherein receiving the transaction request comprises:
receiving a withdrawal request for a first specified amount of cash funds;
receiving a deposit request for a second specified amount of cash funds;
receiving a funds transfer request between the financial account and another financial account; or
receiving an account balance request associated with the financial account.

23. A method, comprising:
receiving, via an electrical interface of an automated teller machine (ATM), a power from a portable power source, wherein the ATM includes a first display;
entering a reduced power mode, wherein the ATM is powered by a rechargeable battery in the reduced power mode; and
while in the reduced power mode:
preventing use of the first display;
receiving, from a banking application installed on a mobile device, a transaction request including an authentication credential, wherein the mobile device includes a second display and wherein the mobile device receives a message including a status of the ATM based on a location of the mobile device with respect to the ATM, the status indicating that the ATM is in an outage mode prior to entering the reduced power mode, and wherein the mobile device is prompted to provide power to the ATM in response to receiving the message;
determining an authorization result based at least on the transaction request, the authorization result indicating whether to perform the transaction request; and
providing the authorization result via the second display in response to being prevented from utilizing the first display.

24. The method of claim 23, wherein receiving the transaction request comprises: (i) receiving a withdrawal request for a first specified amount of cash funds, (ii) receiving a deposit request for a second specified amount of cash funds, (iii) receiving a funds transfer request between an account and another account, or (iv) receiving an account balance request associated with the account.

25. The method of claim 24, wherein determining the authorization result comprises comparing the first specified amount to an outage withdrawal limit.

26. The method of claim 23, further comprising completing the transaction request based at least in part on the authorization result.

27. The method of claim 23, wherein receiving the transaction request comprises receiving a withdrawal request for a specified amount of cash funds, and wherein determining the authorization result comprises:
requesting, from the banking application or a banking service, an account balance associated with an account; and
comparing the specified amount of cash funds to the account balance and to a cash balance associated with a safe of the ATM.

28. The method of claim 23, wherein determining the authorization result comprises:
sending, via the mobile device, the transaction request to a banking service;
receiving, via the mobile device, the authorization result from the banking service.

29. The method of claim 23, further comprising:
generating a blockchain block by performing a cryptographic algorithm using the transaction request, the authorization result, and a first blockchain;
adding the blockchain block to the first blockchain to generate a second blockchain; and distributing the second blockchain to an electronic device associated with the first blockchain.

30. The method of claim 23, wherein the mobile device is a first mobile device, and the portable power source is a power bank or a second mobile device.

* * * * *